Patented May 4, 1948

2,441,114

UNITED STATES PATENT OFFICE 2,441,114

PROCESS FOR HYDROLYZING ORGANIC NITRILES AND DEHYDRATING ETHERS

Vernon K. Krieble, Hartford, Conn., and Robert H. Smellie, Oak Ridge, Tenn.

No Drawing. Application November 25, 1944, Serial No. 565,186

19 Claims. (Cl. 260—338)

This invention relates to a process for hydrolyzing organic nitriles (including hydrogen cyanide) and to a process for dehydrating ethers.

It is known that organic nitriles can be hydrolyzed in the presence of acids. We have now found that organic nitriles can be hydrolyzed at a greatly increased rate by reacting the organic nitrile, water and hydrogen chloride, in an ether. By employing the proper amount of the nitrile, anhydrous ethers can be simultaneously obtained.

It is accordingly, an object of our invention to provide a process for hydrolyzing organic nitriles. A further object is to provide a process for dehydrating ethers. Other objects will become apparent hereinafter.

In accordance with our invention, we hydrolyze organic nitriles (including hydrogen cyanide) by reacting an organic nitrile, water and hydrogen chloride, in an ether which is liquid at 25° C. The reaction which takes place can be illustrated by the following chemical equations:

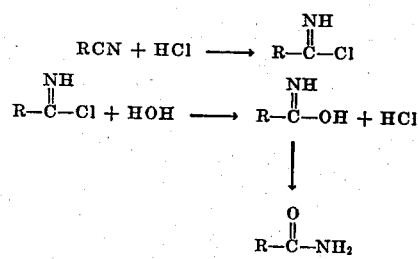

wherein R represents hydrogen or an organic radical, e. g., alkyl, aralkyl or aryl. Polynitriles can be employed.

It will be observed from these equations that an imino-acyl chloride is formed during the reaction. This material apparently reacts very rapidly with water to give an amide and to regenerate hydrogen chloride. Accordingly, the hydrogen chloride need not be employed in an amount chemically equivalent to the nitrile. However, depending upon the amount of water present, a part or all of the amide may be hydrolyzed to the corresponding acid, with the simultaneous formation of ammonia which reacts immediately with the hydrogen chloride to form ammonium chloride, thereby reducing the effective concentration of hydrogen chloride.

Nitriles of all kinds can be hydrolyzed by our process, e. g. hydrogen cyanide (formonitrile), acetonitrile, n-butyronitrile, phenylacetonitrile, benzonitrile, tetrahydro-2-furanacetonitrile, succinonitrile, stearonitrile, lactonitrile, etc.

To hydrolyze an organic mononitrile to the corresponding amide, about equimolecular proportions of nitrile and water are advantageously employed. To hydrolyze an organic mononitrile to the corresponding acid, at least two molecular proportions of water (and preferably more) should be employed for each molecular proportion of nitrile.

In practicing our invention, saturated ethers, especially dialkyl ethers, which are liquid at 25° C. are advantageously employed. Typical dialkyl ethers include methyl n-propyl ether, di-ethyl ether and diisopropyl ether. Polyethers can also be employed, e. g., ethylene glycol diethyl ether. Cyclic ethers can also be employed, e. g., 1,4-dioxane and ethylene glycol formal. Ethers containing substituents can be employed, but ethers containing hydroxyl, primary amino or secondary amino groups may tend to react with the imino acyl chloride. To dehydrate ethers, sufficient of the nitrile should be employed to generate enough imino acyl chloride to dissipate substantially all the water. In the case of a mononitrile, at least one molecular proportion of nitrile for each molecular proportion of water present, should be employed.

The following examples will serve to illustrate the manner of practicing our invention.

*Example 1.—Dehydration of 1,4-dioxane and production of formamide*

A solution containing 90 g. of purified 1,4-dioxane, 23 g. of hydrogen chloride (0.63 mole), and 4.8 g. (0.27 mole) of water was mixed with 12.3 g. (0.49 mole) of liquid hydrogen cyanide and the resulting mixture was placed in a reaction flask equipped with a thermometer (bulb in the liquid), the flask being connected by way of a three-way stopcock to a manometer and a hydrogen chloride recovery system. The temperature rose steadily from 3° C. (at the time of mixing) to 50° C. within four minutes. At this temperature, the pressure within the apparatus suddenly became less than atmospheric pressure by about 40 mm. of mercury. The temperature continued to rise to 65° C. and remained for about 5 minutes. About 10 minutes after mixing, ammonium chloride suddenly precipitated out and the temperature began to fall. The contents of the flask were cooled and the ammonium chloride was filtered off by gravity. The filtrate was distilled through a Snyder floating ball column. 72 g. of pure 1,4-dioxane distilled off at 101° C. The dioxane which was obtained had a refractive index (25°/D) of 1.4210 which was the refractive index of the purified 1,4-dioxane which had been employed as starting material. The residue in the still contained a small amount of ammonium chloride (which was filtered off) and a viscous liquid. The viscous liquid was distilled under reduced pressure and yielded 8 g. more of dioxane and 8 g. of colorless formamide boiling between 106° and 108° C. at 15 mm. of mercury pressure. The combined ammonium chloride residues weighed 2 g.

*Example 2.—Dehydration of 1,4-dioxane and production of acetamide*

A cooled solution containing 65 g. of 1,4-dioxane, 33 g. of hydrogen chloride and 12 g. (0.7 mole) of water was mixed with 41 g. (1 mole) of acetonitrile and placed in a flask equipped with a thermometer (bulb in liquid), the flask being connected by way of a three-way stopcock to a manometer and a hydrogen chloride recovery system. The temperature of the mixture immediately after mixing was 12° C. The temperature began to rise steadily and reached 65° C. in about 17 minutes after mixing. The pressure within the flask decreased below atmospheric pressure and the temperature rose to 60° C. Acetamide hydrochloride began to precipitate. The temperature remained at about 60° C. for about 20 minutes longer and acetamide hydrochloride continued to precipitate. The temperature began to drop slowly and when it reached 35° C., the contents of the flask were cooled by immersing the flask in an ice bath. The acetamide hydrochloride was filtered from the cold mixture and washed with anhydrous diethyl ether to facilitate drying. 60 g. of pure acetamide hydrochloride were obtained. This constituted a 95 per cent yield based upon the amount of water which was present. The 1,4-dioxane filtrate was distilled through a Snyder floating ball column. Hydrogen chloride was given off first as a gas and then 13 g. of acetonitrile distilled off at 82° C. The remainder of the liquid distilled off at 101° C. and consists of 53 cc. of substantially anhydrous 1,4-dioxane. 1.5 g. of acetamide hydrochloride was obtained as a residue in the distilled flask.

*Example 3.—Production of phenylacetamide*

11.7 g. (0.1 mole) of phenylacetonitrile were mixed with 15 cc. of 8.25 molal hydrogen chloride in 87 per cent aqueous 1,4-dioxane. The mixture was allowed to stand at about 25° C. for about 10 hours. The mixture (which had become very viscous) was then freed of hydrogen chloride and some 1,4-dioxane by means of an aspirator. The remaining heavy liquid was poured into 250 cc. of water and immediately a pale yellow solid precipitate formed. This was filtered off and washed with water. It weighed 11 g. when dry, constituting an 82 per cent yield of phenylacetamide.

*Example 4.—Production of benzamide*

10.3 g (0.1 mole) of benzonitrile were mixed with 15 cc. of 8.25 molal hydrogen chloride in 87 per cent aqueous 1,4-dioxane. The mixture was allowed to stand at about 25° C. for 10 hours. The mixture was then freed of hydrogen chloride and some dioxane by means of an aspirator. Benzamide began to crystallize out after some of the hydrogen chloride and dioxane were removed. The solid which separated out was washed out of the flask with water and filtered. Upon drying, 4 g. of benzamide melting at 130° C. were obtained.

*Example 5.—Dehydration of diethyl ether*

Diethyl ether was thoroughly shaken up in a separator funnel with an aqueous solution of ferrous sulfate in order to remove peroxides from the ether and to saturate the ether with water. 200 cc. of the resulting ether containing water was about one-half saturated with hydrogen chloride at 0° C. To this solution 15 cc. of liquid hydrocyanic acid were added. The temperature immediately after mixing was 10° C. and increased to 20° C. within 10 minutes. The solution was cooled to 15° C. whereupon ammonium chloride started to crystallize out. The temperature was allowed to again reach 20° C. and the mixture was then again cooled to 15° C. After 30 minutes, the reaction appeared to be complete. By this time there was a heavy precipitate of ammonium chloride. The ether was decanted from the ammonium chloride and distilled. The distilled ether when mixed with twice its volume of freshly distilled carbon bisulfide gave no opalescence whatsoever even when cooled to 0° C. showing the absence of water in the ether. The starting aqueous ether, on the other hand, turned milky when mixed with freshly distilled carbon bisulfide owing to the separation of water.

*Example 6.—Hydrolysis of hydrogen cyanide to formic acid in 1,4-dioxane*

12.2 g. (0.48 mole) of hydrocyanic acid dissolved in 20.2 g. (1.12 mole) of water were slowly added during the course of 10 minutes to 55 g. of a 30 per cent (by weight) solution of hydrogen chloride in 1,4-dioxane, the dioxane solution being in an ice bath during the addition of the hydrocyanic acid. The resulting mixture contained hydrogen chloride, hydrogen cyanide and water in the molecular ratio of approximately 1:1:2.25. After the mixture had stood for about 40 minutes, it was removed from the ice bath. The temperature of the mixture rose quickly to about 50° C. and then fell gradually to room temperature. Ammonium chloride began separating out, 20 minutes after the first addition of hydrocyanic acid to the 1,4-dioxane solution. When the temperature of the mixture had reached room temperature (indicating that the reaction was over), the ammonium chloride was filtered off and washed with anhydrous diethyl ether. The ammonium chloride weighed 22 g., 91.5 per cent yield based on the hydrocyanic acid employed. The filtrate contained less than 0.1 g. of hydrogen cyanide and 31.5 per cent (by weight) of formic acid.

The filtrate containing water, formic acid and 1,4-dioxane can be distilled to obtain an azeotrope of water and formic acid, as illustrated in the following example.

*Example 7.—Fractional distillation of a mixture containing water, 1,4-dioxane and formic acid*

225 cc. of a mixture containing 1,4-dioxane, water and 38 g. of formic acid was distilled through a Snyder floating ball fractionating column. The following fractions were collected:

1. 154 cc. between 87°–88° C.
2. 8 cc. between 90°–100° C.
3. 14 cc. between 100°–105° C.
4. 19 cc. between 105°–107° C.
5. 16 cc. residue.

Each fraction was analyzed for formic acid with the following results:

1. Mere trace.
2. 0.6 g. formic acid.
3. 4.6 g. formic acid.
4. 17.5 g. formic acid.
5. 14.7 g. formic acid.

Fraction 1 is an azeotropic mixture of water and 1,4-dioxane containing 87 per cent by weight of the dioxane. Fraction 4 is an azeotropic mixture of water and formic acid, as is Fraction 5 which represents the residue which could not be distilled through the column. The first three fractions obtained in this distillation can be employed in the hydrolysis of further hydrogen cyanide. Fractions 4 and 5 can be treated with hydrogen cyanide and hydrogen chloride to generate further formic acid, thereby concentrating these fractions by removal of the water.

*Example 8.—Hydrolysis of hydrogen cyanide to formic acid in diisopropyl ether*

A flask containing 140 cc. of diisopropyl ether saturated with hydrogen chloride was immersed in an ice bath. During the course of 12 minutes, a solution containing 14 g. of hydrogen cyanide (0.5 mole) and 27 g. of water (1.5 mole) was added. The temperature of the reaction mixture rose to 50° C. By the time all of the hydrogen cyanide solution had been added, ammonium chloride began to separate out. When the temperature of the reaction mixture had subsided to that of room temperature, the ammonium chloride was filtered off, washed with diethyl ether and dried. 26.7 g. was obtained or 96 per cent yield based on the amount of hydrogen cyanide employed. The filtrate which contains diisopropyl ether, formic acid and water can be distilled to obtain aqueous formic acid.

*Example 9.—Hydrolysis of acetonitrile to acetamide in 1,4-dioxane*

60 g. of a 30 per cent solution of hydrogen chloride in 1,4-dioxane were cooled in an ice bath. To the cooled solution, 7 g. of acetonitrile (3/18 mole) mixed with 7 g. of water (7/18 mole) were slowly added to the dioxane solution. The temperature began to rise and reached 45° C. Within 30 minutes, a precipitate separated out. At the end of 2 hours, the temperature of the mixture had returned to room temperature and the precipitate was quite heavy. The mixture was then heated for one hour at 50° C. after which it was again cooled in an ice bath and the solid material filtered off. The solid material was washed with diethyl ether and dried. It was acetamide hydrochloride and weighed 15.5 g. Although an excess of water was employed in this hydrolysis, the filtrate from the acetamide hydrochloride contained no acetic acid. The yield of acetamide hydrochloride obtained was almost 100 per cent, based upon the amount of the acetonitrile employed.

In a manner similar to that illustrated in the foregoing examples, other ethers can be dehydrated and other nitriles can be hydrolyzed.

What we claim as our invention and desire to be secured by Letters Patent of the United States is:

1. A process for hydrolyzing an organic nitrile comprising reacting an organic nitrile with water, in the presence of hydrogen chloride, in an ether which is liquid at 25° C.

2. A process for hydrolyzing an organic nitrile comprising reacting an organic nitrile with water, in the presence of hydrogen chloride, in 1,4-dioxane.

3. A process for hydrolyzing an organic nitrile comprising reacting an organic nitrile with water, in the presence of hydrogen chloride, in a dialkyl ether which is liquid at 25° C.

4. A process for hydrolyzing an organic nitrile comprising reacting an organic nitrile with water, in the presence of hydrogen chloride, in a saturated ether which is liquid at 25° C.

5. A process for hydrolyzing hydrogen cyanide comprising reacting hydrogen cyanide with water, in the presence of hydrogen chloride, in a saturated ether which is liquid at 25° C.

6. A process for hydrolyzing hydrogen cyanide comprising reacting hydrogen cyanide with water, in the presence of hydrogen chloride, in 1,4-dioxane.

7. A process for hydrolyzing acetonitrile comprising reacting acetonitrile with water, in the presence of hydrogen chloride, in a saturated ether which is liquid at 25° C.

8. A process for hydrolyzing acetonitrile comprising reacting acetonitrile with water, in the presence of hydrogen chloride, in 1,4-dioxane.

9. A process for dehydrating an ether which is liquid at 25° C. and which contains dissolved water comprising reacting the aqueous ether with an organic nitrile and hydrogen chloride, the quantity of organic nitrile and hydrogen chloride being at least sufficient to react with substantially all the water which is present.

10. A process for dehydrating a saturated ether which is liquid at 25° C. and which contains dissolved water comprising reacting the aqueous ether with an organic nitrile and hydrogen chloride, the quantity of organic nitrile and hydrogen chloride employed being at least sufficient to react with substantially all the water which is present.

11. A process for dehydrating a dialkyl ether which is liquid at 25° C. and which contains dissolved water comprising reacting the aqueous dialkyl ether with an organic nitrile and hydrogen chloride, the quantity of organic nitrile and hydrogen chloride employed being at least sufficient to react with substantially all the water which is present.

12. A process for dehydrating a saturated ether which is liquid at 25° C. and which contains dissolved water comprising reacting the aqueous ether with hydrogen cyanide and hydrogen chloride, the quantity of hydrogen cyanide and hydrogen chloride employed being at least sufficient to react with substantially all the water which is present.

13. A process for dehydrating a dialkyl ether which is liquid at 25° C. and which contains dissolved water comprising reacting the aqueous dialkyl ether with hydrogen cyanide and hydrogen chloride, the quantity of hydrogen cyanide and hydrogen chloride employed being at least sufficient to react with substantially all the water which is present.

14. A process for dehydrating a dioxane which contains dissolved water comprising reacting the aqueous dioxane with hydrogen cyanide and hydrogen chloride, the quantity of hydrogen cyanide and hydrogen chloride employed being at least sufficient to react with substantially all the water which is present.

15. A process for dehydrating 1,4-dioxane which contains dissolved water comprising reacting the aqueous 1,4-dioxane with hydrogen cyanide and hydrogen chloride, the quantity of hydrogen cyanide and hydrogen chloride employed being at least sufficient to react with substantially all the water which is present.

16. A process for hydrolyzing hydrogen cyanide comprising reacting one molecular proportion of hydrogen cyanide with at least one molecular proportion of water, in the presence of hydrogen chloride, in a saturated ether which is liquid at 25° C.

17. A process for hydrolyzing hydrogen cyanide comprising reacting one molecular proportion of hydrogen cyanide with at least two molecular proportions of water, in the presence of hydrogen chloride, in a saturated ether which is liquid at 25° C.

18. A process for hydrolyzing hydrogen cyanide comprising reacting one molecular proportion of hydrogen cyanide with at least two molecular proportions of water, in the presence of hydrogen chloride, in a dialkyl ether which is liquid at 25° C.

19. A process for hydrolyzing hydrogen cyanide comprising reacting one molecular proportion of hydrogen cyanide with at least two molecular proportions of water, in the presence of hydrogen chloride, in 1,4-dioxane.

VERNON K. KRIEBLE.
ROBERT H. SMELLIE.

REFERENCES CITED

The following references are of record in the file of this patent:

UNITED STATES PATENTS

| Number | Name | Date |
|---|---|---|
| 1,466,436 | Hammond | Aug. 28, 1923 |
| 1,581,621 | Trusler | Apr. 20, 1926 |
| 1,829,208 | Bauer | Oct. 27, 1931 |
| 1,848,664 | Rohde | Mar. 8, 1932 |
| 2,101,821 | Crawford | Dec. 7, 1937 |
| 2,253,755 | Brant | Aug. 26, 1941 |
| 2,400,463 | Lichty | May 14, 1946 |

FOREIGN PATENTS

| Number | Country | Date |
|---|---|---|
| 138,515 | Germany | Feb. 25, 1903 |
| 298,822 | Germany | Nov. 12, 1919 |
| 410,185 | Germany | Feb. 25, 1925 |

OTHER REFERENCES

Krieble et al., "Jour. Amer. Chem. Soc.," vol 61 (1939), pages 560–563.

Sidgwick's "Organic Chemistry of Nitrogen,' 1937, pages 139, 140, 310 to 313.

Steinkopf et al., "Berichte Deutsche Chem. Gesell.," vol. 44 (1911), page 2902.